No. 733,000. Patented July 7, 1903.

UNITED STATES PATENT OFFICE.

FERDINAND BRÜNJES, OF LANGELSHEIM, GERMANY.

PROCESS OF OBTAINING SULFID OF ZINC FROM COPPER SLAG.

SPECIFICATION forming part of Letters Patent No. 733,000, dated July 7, 1903.

Application filed August 11, 1902. Serial No. 119,326. (No specimens.)

*To all whom it may concern:*

Be it known that I, FERDINAND BRÜNJES, a subject of the King of Prussia, German Emperor, residing at the city of Langelsheim, Germany, have invented certain new and useful Improvements in Processes of Obtaining Sulfid of Zinc from Copper Slag; and I do hereby declare the following to be a full, clear, and exact description of the invention, such as will enable others skilled in the art to which it appertains to make and use the same.

This invention relates to a process for obtaining sulfid of zinc from copper slag which contains zinc and barium.

The invention consists in treating the ground copper slag with so much diluted hydrochloric acid that barium, calcium, and iron pass into solution as chlorids, while the zinc separates as zinc sulfid.

In carrying out the invention the copper slag, which holds the zinc wholly or in part as zinc oxid, with presence of calcium, barium, and iron sulfid, is ground, preferably, in a conical mill and the fine powder treated with only so much hydrochloric acid that barium, calcium, and iron pass into solution as chlorids, while the zinc is carried over into insoluble sulfid of zinc, the following reaction then taking place:

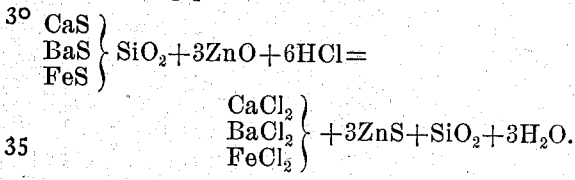

The following proportions of the ingredients have been found advantageous for the process: one thousand kilos fine ground slag, one thousand kilos hydrochloric acid of commerce, two hundred and fifty kilos water.

The opening out of the slag with hydrochloric acid is effected in stationary closed vessels provided with stirring apparatus in the manner that two hundred and fifty kilos of water are first supplied to the vessel and then the one thousand kilos of slag is added. This being done, the hydrochloric acid is allowed to flow in. The reaction begins at once, the temperature rising up to 120° centigrade. In about half an hour the reaction ceases and nearly all the zinc oxid transformed into zinc sulfid, this latter in the form of quite fine slime suspended in the lye, from which it is separated by filter-presses, washed out, and dried. The zinc of the sulfid that remains in the press, together with the insoluble silica, may be recovered in any well-known manner—as, for example, by oxidizing or roasting to convert the zinc into oxid, which is then reduced with carbon and distilled, the silica remaining in the retort. The filtration takes place very easily, as the silicic acid has become quite insoluble at 120° centigrade, the lyes show a specific gravity of 1.28 to 1.30, and in cooling let fall half of the chlorid of barium. To obtain the remainder of the chlorid of barium, the lye is then evaporated to 39° to 40° Baumé and said chlorid separated from the lye in centrifugals, (hydro-extractors.)

With zinc slag which contains the zinc as zinc oxid with presence of oxid of iron, but free from barium and calcium sulfid, an addition is made of so much of these two latter substances or a mixture of them that for one equivalent of oxid of zinc there is one equivalent of said sulfids. The intimate mixture is treated with hydrochloric acid in the described manner.

From lyes which contain chlorid of zinc with presence of chlorid of iron the zinc is in accordance with the foregoing equation thoroughly separated as sulfid of zinc by addition of barium or calcium sulfid or a mixture of both sulfids.

Having now particularly described and ascertained the nature of my said invention and in what manner the same is to be performed, I declare that what I claim is—

1. A process of treating slags containing zinc oxid and barium, iron and calcium sulfid, which consists in treating the finely-ground slag with sufficient dilute hydrochloric acid to convert the iron, barium and calcium into chlorids, liberate hydrogen sulfid and thereby precipitate the zinc as sulfid, substantially as described.

2. A process of treating slags containing zinc oxid and sulfids of other metals capable of forming soluble chlorids, which consists in adding to the slag sufficient hydrochloric acid to convert the sulfids into soluble chlorids, liberate hydrogen sulfid and thereby precipitating zinc sulfid and separating the precipitate from the solution, substantially as described.

3. A process of treating slags containing zinc oxid and sulfids of other metals capable of forming soluble chlorids, which consists in adding to the slag dilute hydrochloric acid to convert the sulfids into chlorids, liberate hydrogen sulfid and thereby precipitating zinc sulfid, separating the precipitate, and adding to the solution the sulfid of a metal of the alkaline earths to convert any zinc chlorid into sulfid, substantially as described.

In testimony that I claim the foregoing as my invention I have signed my name in presence of two subscribing witnesses.

FERDINAND BRÜNJES.

Witnesses:
 LUISE KNOKE,
 EMMA G. WHITE.